(12) United States Patent
Lin et al.

(10) Patent No.: US 8,989,270 B2
(45) Date of Patent: Mar. 24, 2015

(54) OPTIMIZED SEARCH FOR REFERENCE FRAMES IN PREDICTIVE VIDEO CODING SYSTEM

(75) Inventors: Yao-Chung Lin, Mountain View, CA (US); Xiaosong Zhou, Campbell, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 493 days.

(21) Appl. No.: 13/397,291

(22) Filed: Feb. 15, 2012

(65) Prior Publication Data

US 2012/0328018 A1   Dec. 27, 2012

Related U.S. Application Data

(60) Provisional application No. 61/500,509, filed on Jun. 23, 2011.

(51) Int. Cl.
| | | |
|---|---|---|
| H04N 7/32 | (2006.01) | |
| H04N 7/26 | (2006.01) | |
| H04N 19/573 | (2014.01) | |
| H04N 19/105 | (2014.01) | |
| H04N 19/51 | (2014.01) | |
| H04N 19/14 | (2014.01) | |
| H04N 11/02 | (2006.01) | |
| H04N 11/04 | (2006.01) | |
| G06K 9/00 | (2006.01) | |
| H04B 1/66 | (2006.01) | |
| H04N 7/12 | (2006.01) | |

(52) U.S. Cl.
CPC ........... *H04N 19/573* (2014.11); *H04N 19/105* (2014.11); *H04N 19/51* (2014.11); *H04N 19/14* (2014.11)

USPC ............. 375/240.16; 375/240.24; 375/240.1; 382/107

(58) Field of Classification Search
CPC ............. H04N 7/32; H04N 7/26; G06K 9/36; H04B 1/66
USPC .......................... 375/40.16, 240.12, 240.16, 375/240.02–240.25, 240.17, E7.243; 382/236, 243, 107; 386/111
See application file for complete search history.

(56) References Cited

U.S. PATENT DOCUMENTS

| | | |
|---|---|---|
| 6,888,894 B2 | 5/2005 | Prakash et al. |
| 7,050,503 B2 | 5/2006 | Prakash et al. |
| 7,082,162 B2 | 7/2006 | Prakash et al. |
| 7,139,317 B2 | 11/2006 | Prakash et al. |
| 7,912,130 B2 | 3/2011 | Suzuki et al. |
| 2003/0035484 A1 | 2/2003 | Prakash et al. |
| 2006/0171454 A1 | 8/2006 | Jung |
| 2007/0030901 A1* | 2/2007 | Joch et al. ................ 375/240.16 |
| 2007/0268964 A1* | 11/2007 | Zhao .......................... 375/240.1 |
| 2008/0112483 A1* | 5/2008 | Lu et al. .................... 375/240.03 |
| 2008/0152194 A1* | 6/2008 | Lee et al. ...................... 382/107 |

(Continued)

*Primary Examiner* — Dave Czekaj
*Assistant Examiner* — Dramos I Kalapodas
(74) *Attorney, Agent, or Firm* — Kenyon & Kenyon LLP

(57) ABSTRACT

A system and method for efficiently performing motion estimation during temporal prediction for coding. When a new frame is presented for coding, an encoder may identify a limited number of pixel blocks within the input frame that are complex. The encoder may perform motion estimation searches to find reference frame(s) that are adequate prediction references for the complex pixel blocks. The encoder may search for prediction references for the remaining pixel blocks of the new frame, confining the search to the reference frame(s) that were selected as prediction references of the complex pixel blocks.

36 Claims, 5 Drawing Sheets

(b)

(56) References Cited

U.S. PATENT DOCUMENTS

| | | |
|---|---|---|
| 2008/0170626 A1 | 7/2008 | Sung et al. |
| 2009/0207915 A1* | 8/2009 | Yan et al. ................. 375/240.16 |
| 2010/0086029 A1* | 4/2010 | Chen et al. ............... 375/240.12 |
| 2010/0296579 A1 | 11/2010 | Panchal et al. |
| 2011/0135004 A1* | 6/2011 | Joch et al. ................ 375/240.16 |
| 2011/0280308 A1* | 11/2011 | Oishi et al. ............... 375/240.16 |
| 2012/0195364 A1* | 8/2012 | Yi et al. ................... 375/240.02 |
| 2012/0207212 A1* | 8/2012 | Lin et al. .................. 375/240.08 |
| 2012/0207214 A1* | 8/2012 | Zhou et al. ............... 375/240.12 |

* cited by examiner

200

300

400

500

US 8,989,270 B2

OPTIMIZED SEARCH FOR REFERENCE FRAMES IN PREDICTIVE VIDEO CODING SYSTEM

CROSS REFERENCE TO RELATED APPLICATIONS

This application claims the benefit of priority to previously filed U.S. provisional patent application Ser. No. 61/500,509, filed Jun. 23, 2011, entitled OPTIMIZED SEARCH FOR REFERENCE FRAMES IN PREDICTIVE VIDEO CODING SYSTEM. That provisional application is hereby incorporated by reference in its entirety.

BACKGROUND

Aspects of the present invention relate generally to the field of video processing, and more specifically to a predictive video coding system.

In conventional video coding systems, an encoder may code a source video sequence into a coded representation that has a smaller bit rate than does the source video and, thereby achieve data compression. The encoder may include a pre-processor to perform video processing operations on the source video sequence, such as filtering or other processing operations, that may improve the efficiency of the coding operations performed by the encoder.

The encoder may code each frame of the processed video data according to any of a variety of different coding techniques to achieve data compression. Using predictive coding techniques (e.g., temporal/motion predictive encoding), predictive video coders exploit temporal redundancy in a source video stream by predicting content of pixel blocks in a current frame with reference to previously-coded frames, called "reference frames." An encoder reconstructs coded reference frames and stores them locally for use in coding later-received video data. When coding a new frame, the frames typically are parsed into pixel blocks. For each pixel block in the frame, the encoder searches for adequate matches among the reconstructed reference frame data. If an adequate match is found in a reference frame, the encoder selects the reference frame's pixel blocks as a prediction reference for the current pixel block and generates motion vectors identifying a location of the reference pixel block. The encoder further encodes residual data generated representing a difference between the pixel block being coded and the pixel block selected from the reference frame.

The search algorithms that match a prediction pixel block from a reference frame to a pixel block being coded are resource-intensive. Known search methods require an iterative search between the new pixel block and each of the locally-stored reconstructed reference frames. The H.264 video coding standard supports up to 16 reference frames to be active simultaneously at an encoder. Moreover, for each reference frame, the search algorithms involve comparisons between the pixel block being coded and the reference frame data at each motion vector supported by the coding protocol. For example, in H.264 Level 3.1 defines that motion vectors can range from −512 to +511.75 in quarter-pixel increments and the frame size can be up to 3,600 16×16 pixel blocks. Thus, these reference frame searches can involve considerable processing costs for a video coding system.

Accordingly, there is a need in the art for a coding system that performs reference frame searches for predictive coding systems at manageable costs.

DETAILED DESCRIPTION

Figure 1:
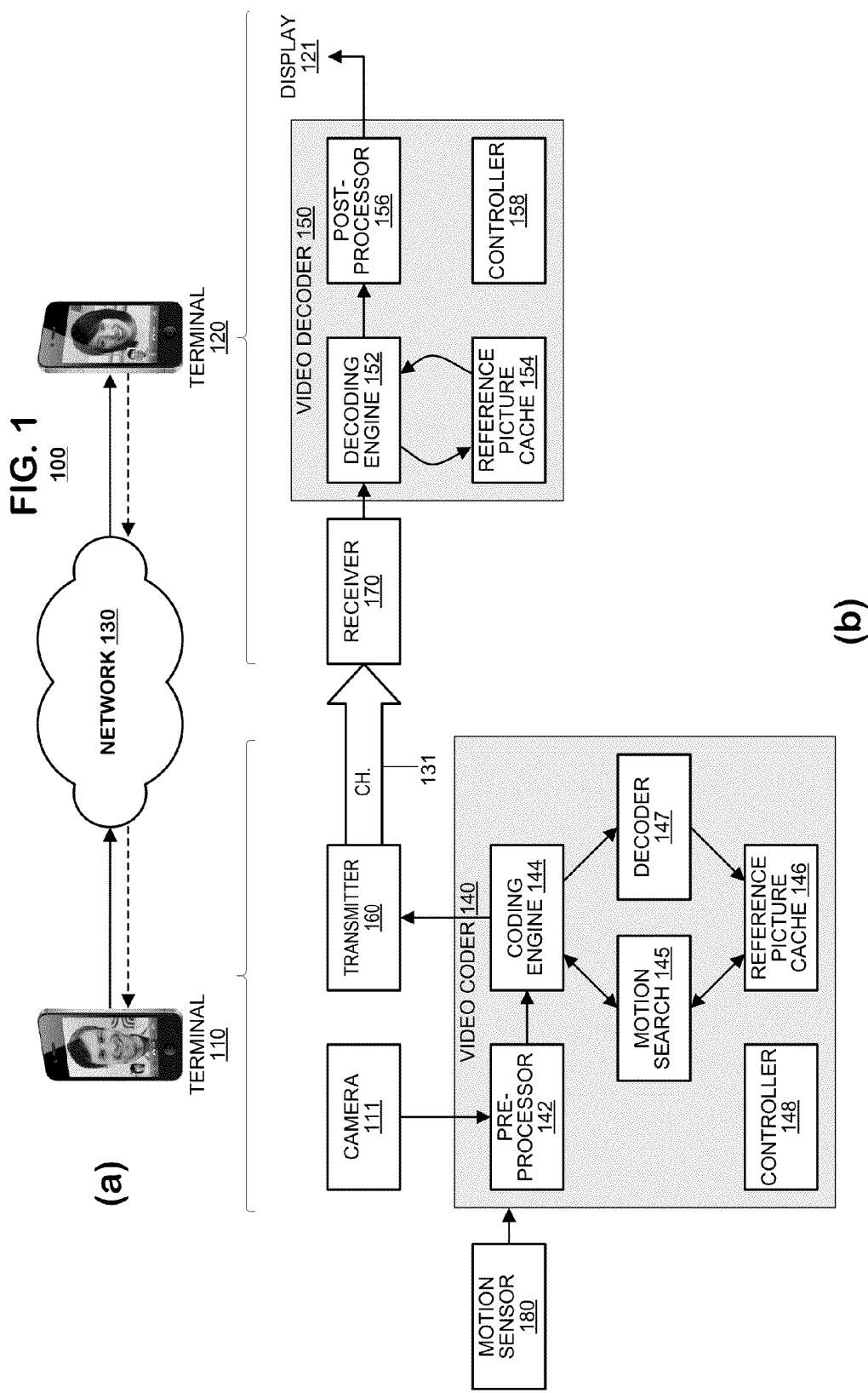
FIG. 1(a) is a simplified block diagram illustrating a video coding system according to an embodiment of the present invention.
FIG. 1(b) is a simplified block diagram illustrating components of an exemplary video coding system according to an embodiment of the present invention.

Embodiments of the present invention provide improved techniques for performing motion estimation during temporal prediction for coding. According to the method, when a new frame is presented for coding, an encoder may identify a limited number of pixel blocks within the input frame that are complex. The encoder may perform motion estimation searches to find reference frame(s) that are adequate prediction references for the complex pixel blocks. Thereafter, the encoder may search for prediction references for the remaining pixel blocks of the new frame, confining the search to the reference frame(s) that were selected as prediction references of the complex pixel blocks. By constraining the motion estimation search to the frame(s) that serve as prediction references to the complex pixel blocks, the present invention conserves processing resources while maintaining high coding quality.

FIG. 1(a) is a simplified block diagram illustrating a video coding system 100 according to an embodiment of the present invention. As shown, the system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, reconstruct the coded data and display video data recovered therefrom.

In FIG. 1(a), the terminals 110, 120 are illustrated as smart phones but the principles of the present invention are not so limited. Embodiments of the present invention find application with personal computers (both desktop and laptop computers), tablet computers, computer servers, media players and/or dedicated video conferencing equipment.

The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 are immaterial to the operation of the present invention unless explained hereinbelow.

FIG. 1(b) is a simplified block diagram illustrating components of an exemplary video coding system 100 according to an embodiment of the present invention. As shown, the video coding system 100 may include a video coder 140 and a video decoder 150. Specifically, FIG. 1(b) illustrates a video coder 140 for terminal 110 and a video decoder 150 for terminal 120. The video coder 140 may code video data captured at a camera 111 of terminal 110 for delivery to the decoder 150. The video decoder 150 may receive the coded video data from the channel 131, reconstruct the coded video data and render the recovered video data at a display 121 of the second terminal 120.

As illustrated, the video coder 140 may include a pre-processor 142, a coding engine 144 and a reference picture cache 146 operating under control of a controller 148. The pre-processor 142 may accept source video from an image capture device 111 such as a camera and may perform various processing operations on the source video to condition it for coding. The coding engine 144 may perform compression operations on the pre-processed source video to reduce spatial and/or temporal redundancies therein. The coding engine 144 may output coded video data to a transmitter 160, which may format the data for transmission over the channel 131 and delivery to the terminal 120. As part of its operation, the video coder 140 also may code new frames of video data according to motion prediction techniques using data stored in the reference picture cache 146 as a prediction reference. The video coder 140, therefore, may include a motion search unit 145 to perform motion estimation searches. A decoder 147 may reconstruct coded video data of the reference frames (generated by the coding engine 144) for storage in the reference picture cache 146.

The pre-processor 142 may perform a variety of video processing operations on the source video output from the camera to condition the source video for coding. The pre-processor 142 may include an array of filters (not shown) such as de-noising filters, sharpening filters, smoothing filters, bilateral filters and the like that may be applied dynamically to the source video based on characteristics observed within the video. The pre-processor 142 may review the source video data from the camera and, in cooperation with the controller 148, may select one or more of the filters for application. Typically, the pre-processor 142 conditions the source video data to efficiently render compression or to preserve image quality in light of data losses that may be incurred as the coding engine 144 operates.

The coding engine 144 may code input video data according to a variety of different coding techniques to achieve compression. The coding engine 144 may compress the images by a motion-compensated prediction. Frames of the input video may be assigned a coding type, such as intra-coding (I-coding), uni-directionally predictive coding (P-coding) or bi-directionally predictive coding (B-coding). The frames further may be parsed into a plurality of pixel blocks and may be coded by transform coding, quantization and entropy coding. Pixel blocks of P- and B-coded frames may be coded predictively, in which case, the video coder 140 may perform a motion estimation search, via motion search unit 145, to identify frames from the reference picture cache 146 that may provide an adequate prediction reference for pixel blocks of a new frame to be coded. The video coder 140 may calculate motion vectors identifying pixel blocks of reconstructed frames stored in the reference picture cache 146 that are used as predictions of the pixel blocks being coded and may generate prediction residuals prior to engaging the transform coding. In an embodiment, the video encoder may operate according to coding protocols defined by ITU H.263, H.264 and the like.

The reference picture cache 146 may store a predetermined number of reconstructed reference frames. The video coder 140 may include a decoder 147 to reconstruct coded reference picture frames. Thus, the video coder 140 may generate a local copy of the reconstructed reference frames that will be obtained by the video decoder 150 when it reconstructs the coded video data. These reconstructed reference picture frames may be stored in the reference picture cache 146. The reference picture cache 146 may have a predetermined cache depth; for example, video coders 140 operating in accordance with H.264 may store up to sixteen (16) reconstructed reference pictures.

The transmitter 160 may transmit the coded video data to the channel 131. In the process, the transmitter 160 may multiplex the coded video data with other data to be transmitted such as coded audio data and control data (provided by processing sources that are not illustrated in FIG. 1(b)). The transmitter 160 may format the multiplexed data into a format appropriate for the network 130 and transmit the data to the network.

The video decoder 150 may include a decoding engine 152, a reference picture cache 154, a post-processor 156 operating under control of a controller 158. The decoding engine 152 may reconstruct coded video data received via the channel 131 with reference to reference pictures stored in the reference picture cache 154. The decoding engine 152 may output reconstructed video data to the post-processor 156, which may perform additional operations on the reconstructed video data to condition it for display. Reconstructed video data of reference frames also may be stored in the reference picture cache 154 for use during decoding of subsequently received coded video data.

The decoding engine 152 may perform decoding operations that invert coding operations performed by the coding engine 144 of the video encoder 140. The decoding engine 152 may perform entropy decoding, dequantization and transform decoding to generate recovered pixel block data. Quantization/dequantization operations are lossy processes and, therefore, the recovered pixel block data likely will be a replica of the source pixel blocks that were coded by the video encoder 140 but include some error. For pixel blocks coded predictively, the transform decoding may generate residual data; the decoding engine 152 may use motion vectors associated with the pixel blocks (which may be implied in some cases) to retrieve predicted pixel blocks from the reference picture cache 154 to be combined with the prediction residuals. Reconstructed pixel blocks may be reassembled into frames and output to the post-processor 156.

The post-processor 156 may perform video processing to condition the recovered video data for rendering, commonly at a display device. Typical post-processing operations may include applying deblocking filters, edge detection filters, ringing filters and the like. The post-processor 156 may output recovered video sequence for rendering on the display 121 or, optionally, stored to memory (not shown) for later retrieval and display.

As discussed, the elements shown in FIG. 1(b)—the camera 111, video coder 140, video decoder 150 and display 121—all support delivery of video data in only one direction, from terminal 110 to terminal 120. The principles of the present invention may be extended to bidirectional exchange of video data, in which case these functional blocks may be replicated to support delivery of video data from terminal 120 to terminal 110, not shown in FIG. 1(a). Thus, the terminal 120 may include its own camera, video coder and transmitter and the terminal 110 may include its own receiver, video decoder and display. Although similarly provisioned, the video encoder/decoder pairs may operate independently of each other. Therefore, pre-processing operations 142 and post-processing operations 156 of a first video encoder/decoder pair 140/150 may be selected dynamically with regard to the video content being processed in one direction. Pre-processing operations and post-processing operations of a second video encoder/decoder pair may be selected dynamically with regard to the video content being processed by the second pair and without regard to the video content being processed by the first pair 140/150.

Figure 2:
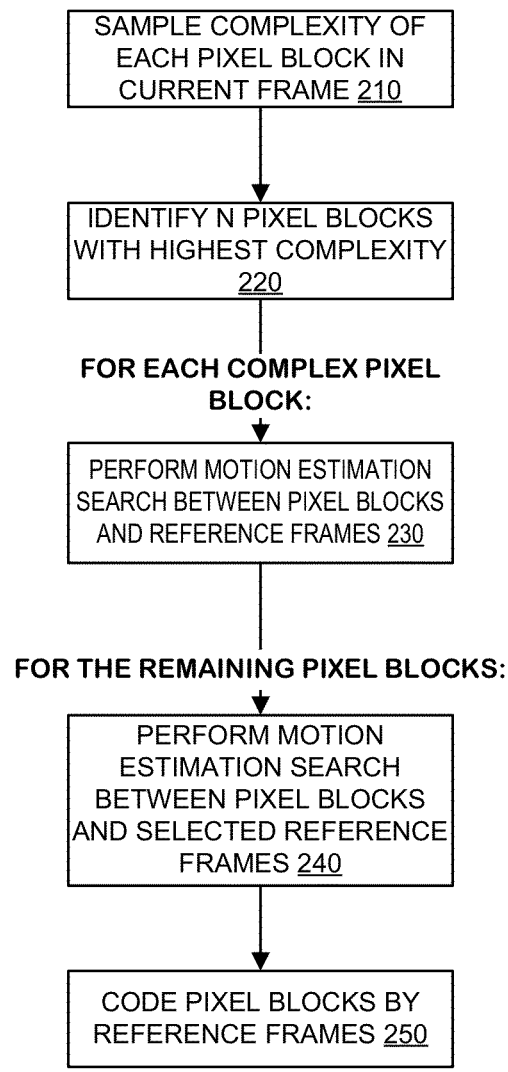
FIG. 2 is a simplified flow diagram illustrating a method for a motion estimation search according to an embodiment of the present invention.

FIG. 2 is a simplified flow diagram illustrating a method 200 for a motion estimation search according to an embodiment of the present invention. The method 200 may operate to select a reference frame from the reference picture cache to be used to code a new frame (the "current frame"). At block 210, the method 200 may sample pixel blocks of the current frame to estimate each pixel block's spatial complexity. At block 220, the method 200 may identify a predetermined number N (N≥1) of pixel blocks with relatively high complexity as "complex pixel blocks" to perform a motion estimation search. At block 230, the method 200 may perform a motion estimation search between the current frame and frames stored in the reference picture cache using each of the complex pixel blocks as a basis of the search. Typically, a limited number of reference frames will be identified as candidate reference frames to serve as prediction references for the complex pixel blocks. If the number of candidate reference frames exceeds a predetermined threshold, the number of candidate reference frames may be limited. Then, for the remaining pixel blocks of the current frame, the method 200 may perform motion estimation searches between the remaining pixel blocks and the candidate reference frame(s) identified in block 230 (block 240). Thereafter, the method 200 may perform motion compensated coding of all pixel blocks in the current frame using the reference frames identified in blocks 230-240 (block 250). Finally, the coded frame data may be transmitted to a decoder.

The method of FIG. 2 is expected to conserve processing resources that otherwise would be spent to perform motion estimation searches between pixel blocks of a current frame and reference frames. By selecting a limited number of complex pixel blocks in the current frame for a full motion estimation search and limiting the number of reference frames available for motion estimation searches of the remaining pixel blocks, the method may conserve resources during the motion estimation processes run on the remaining pixel blocks. Furthermore, the prediction references found for the complex pixel blocks are likely good prediction references for the remaining pixel blocks with lower complexity. Therefore, high coding quality may be preserved.

Figure 3:
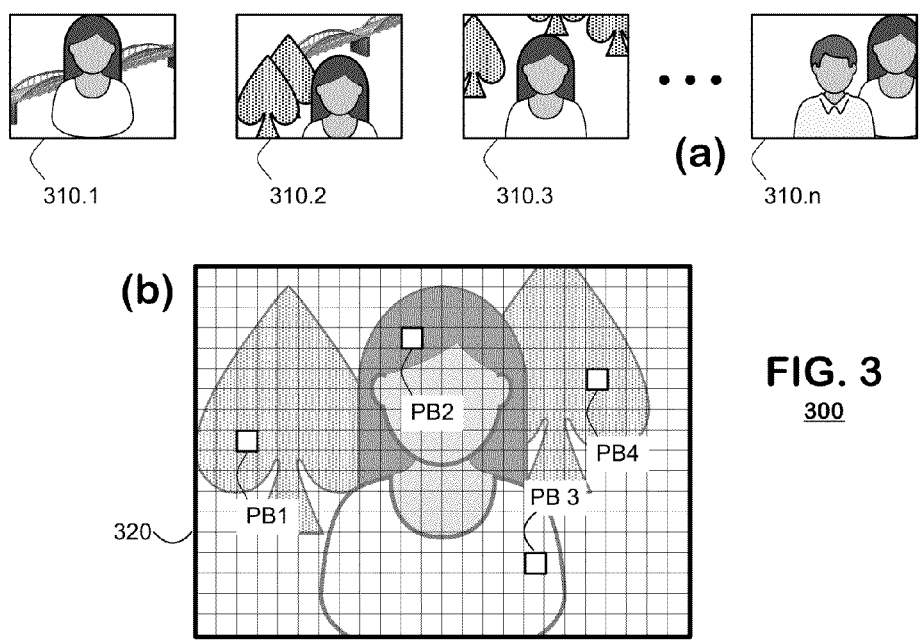
FIGS. 3(a) and (b) illustrate exemplary video data suitable for use with the method for a motion estimation search according to an embodiment of the present invention.

FIGS. 3(*a*) and (*b*) illustrate exemplary video data suitable for use with the method of FIG. 2. FIG. 3(*a*) illustrates a plurality of reference frames 310.1-310.*n* that may be stored by an encoder and may be eligible for use as reference frames during motion compensated predictive coding. FIG. 3(*b*) illustrates an exemplary new frame 320 to be coded with reference to the stored reference frames of FIG. 3(*a*). The frames of FIG. 3(*a*) and FIG. 3(*b*) typically will have common sizes. Frame 320 shown as larger than frames 310.1-310.*n* merely to facilitate discussion of the principles of the present invention.

During operation, the current frame 320 may be parsed into a plurality of pixel blocks, including PB1-PB4. Although the pixel blocks are illustrated as square and having a common size, the principles of the present invention permit parsing according to different schemes which accommodate rectangular pixel blocks and/or pixel blocks of different sizes within a frame. During operation of block 220, an encoder may identify pixel blocks having the highest complexity. For example, pixel blocks PB1 and PB4 may have higher complexity than pixel blocks PB2 and PB3. During operation of block 230, an encoder may search among the stored reference frames 310.1-310.*n* for frame data that provide a good prediction match for the complex pixel blocks PB1 and PB4. In the illustrated example, reference frame 310.2 may provide a good prediction reference for pixel block PB1 but not pixel block PB4. Reference frame 310.3 may provide a good prediction reference for pixel blocks PB1 and PB4. Thus, reference frame 310.3 may be selected as a prediction reference for the current frame 320.

Thereafter, at block 240, an encoder may constrain motion estimation searches to the frame(s) selected during operation of block 230. Accordingly, the current frame 320 (including the low complexity pixel blocks PB2 and PB3) may be coded with reference to reference frame 310.3.

FIG. 3 illustrates a simplified coding example where a single stored reference frame 310.3 provides a closest match to a new frame 320 to be coded. In other use cases, a motion estimation search may identify several reference frames that may provide an adequate prediction reference for a new frame 320. In some embodiments, the encoder may limit the number of candidate frames to a predetermined number (say, 2) based on prediction quality metrics of each reference frame such as prediction errors, magnitudes of motion vectors derived during prediction and the like.

Consider resource savings that might be achieved in a codec operating according to the ITU H.264 standard. H.264 supports up to 16 simultaneously active reference frames. An exemplary 1280×720 pixel video frame may have 3,600 pixel blocks or more in each frame. In a brute force search process, each of the 3,600 pixel blocks might have to be searched against the 16 reference frames. By selecting a predetermined number (say, 5%) of complex pixel blocks in box 230 for search, these pixel blocks may be searched against the 16 reference frames. The remaining 95% of the pixel blocks in the foregoing example may be searched against a smaller number of candidate reference frames that are identified following the search of box 230.

Figure 4:
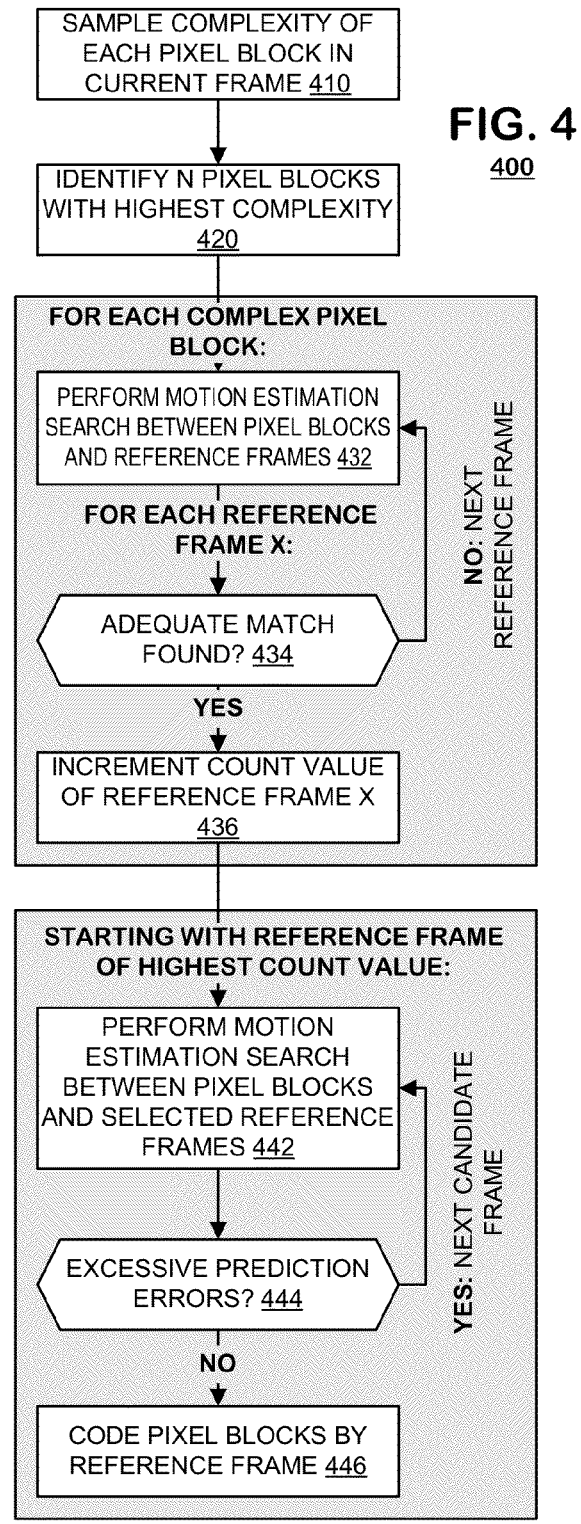
FIG. 4 is a simplified flow diagram illustrating a method for selecting reference frames according to an embodiment of the present invention.

FIG. 4 is a simplified flow diagram illustrating another method 400 for selecting reference frames according to an embodiment of the present invention. The method 400 may begin with block 410, where pixel blocks may be sampled from the current frame to estimate each pixel block's spatial complexity. Then, at block 420 a predetermined number N (where N≥1) of pixel blocks with relatively high complexity may be identified as complex pixel blocks, and a motion estimation search may be performed on the identified complex pixel blocks. For each of the N complex pixel blocks, the method 400 may perform a motion estimation search between the current frame and frames stored in the reference picture cache using the complex pixel blocks as a basis of the search (block 430). For each stored reference frame, at block 434, the method 400 may determine whether the reference frame provides an adequate prediction reference for the complex pixel block. If so, at block 436, the method 400 may increment a count value associated with the reference frame and advance to the next reference frame in the search. Otherwise, the method 400 may directly advance to the next reference frame in the search.

After the count value for each of the reference frames based on the N complex pixel blocks is determined, the method 400 may rank the reference frames according to the derived count values. Starting with the reference frame having the highest count value, the method may iterate through the ranked reference frames and determine a reference frame for coding the current frame. For each ranked reference frame, the method 400 may perform a motion estimation search between the pixel blocks of the current frame and the currently analyzed reference frame (block 442). Then, the method 400 may estimate prediction errors that would arise if the currently analyzed reference frame were used to code the current frame and determine whether they are excessive (block 444). If the prediction errors are not excessive, the method 400 may code the current frame with reference to the currently analyzed reference frame (block 446). On the other hand, if the estimated prediction errors are excessive, the method may repeat the operations of blocks 442-444 using the next, lower ranked reference frame. After the lowest-ranked reference frame has been analyzed, if no reference frame has been identified to generate an acceptable prediction error, the method may code the current frame using the reference frame that provides the lowest prediction error. Accommodation may be made for any pixel blocks that generate unusually high prediction errors by, for example, coding those pixel blocks using intra-coding, or searching for prediction references for those pixel blocks among all available reference frames and coding the pixel blocks accordingly.

Figure 5:
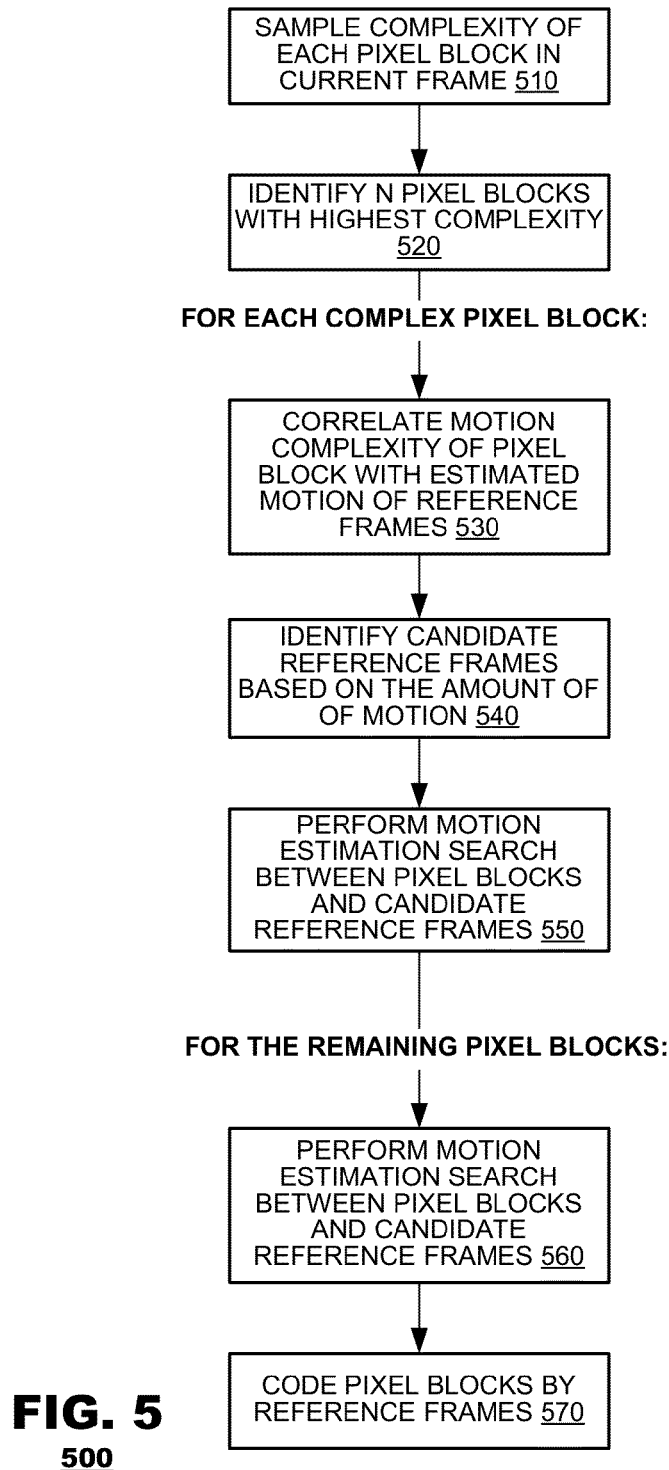
FIG. 5 is a simplified flow diagram illustrating a method for selecting references according to an embodiment of the present invention

FIG. 5 is a simplified flow diagram illustrating a method 500 for a motion estimation search according to an embodiment of the present invention. The method 500 may operate to select a reference frame from the reference picture cache to be used to code a new frame. At block 510, the method 500 may sample pixel blocks of the current frame to estimate each pixel block's complexity. At block 520, a predetermined number N (where N≥1) of pixel blocks with relatively high complexity may be identified as complex pixel blocks to perform a motion estimation search. At block 530, for each complex pixel block, the method 500 may correlate the motion complexity of the complex pixel block with the estimated motion of the reference frames to derive the difference in motion between the current frame and each of the reference frames. If the difference in motion is within a predetermined threshold, the respective reference frame is identified as a candidate reference frame (block 540). Typically, a limited number of reference frames will be identified as candidate reference frames to serve as prediction references for the complex pixel blocks. If the number of candidate reference frames exceeds a predetermined threshold, the number of candidate reference frames may be limited. Then, for the remaining pixel blocks of the current frame, the method 500 may perform motion estimation searches between the remaining pixel blocks and the candidate reference frame(s) identified in block 540 (block 560). Thereafter, the method 500 may perform motion compensated coding of all pixel blocks in the current frame using the reference frames identified in blocks 550-560 (block 570). Finally, the coded frame data may be transmitted to a decoder.

In an embodiment, the candidate reference frames may be selected based on information associated with the frames, such as device motion information (for example, gyro/accelerometer readings) captured by a motion sensor 180 (FIG. 1), face detection results, and frame features developed during the pre-processing stage. The device motion may include the camera orientation and stability information of capturing the respective frame. The reference frames with very different orientation as compared to the current frame may be screened out. Similarly, the screening can also be done by comparing the current frame and the reference frame based on their face detection results, histograms, frame pixel value means and variances.

In another embodiment, frames may be parsed not only into pixel blocks before operation of the method but also into foreground elements and background elements. For example, the foreground elements may comprise a detected face by using face detection technology. Alternatively, the distinction between foreground and background elements may be based on exposure of image content; content that is well exposed may be assigned to a foreground and content that is under-exposed or over-exposed may be assigned to a background. In such embodiments, the foregoing methods may be performed twice on a new frame to be coded—a first instance of the method may be performed upon pixel blocks assigned to a foreground of an image and a second instance of the method may be performed upon pixel blocks assigned to a background of the image. For example, the detected face position and/or size in the current frame may be compared with elements in a reference frame. In this embodiment, the different instances of the method may generate independent sets of reference frames for coding as determined by the image data of the foreground elements, the background elements and the reference frames.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 1 illustrates the components of video coders and decoders as separate units. In one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders typically will include functional units in addition to those described herein, including audio processing systems, buffers to store data throughout the coding pipelines as illustrated and communication transceivers to manage communication with the communication network and a counterpart decoder device. Such elements have been omitted from the foregoing discussion for clarity.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A video coding method, comprising:
    when a new frame is presented for coding, identifying from among pixel blocks of the new frame a plurality of complex pixel blocks,
    first searching for prediction references for the complex pixel blocks from among a plurality of reference frames,
    identifying candidate reference frame(s) from the first searching,
    second searching for prediction references for remaining pixel blocks of the new frame, wherein the second searching is limited to the candidate reference frame(s), and
    coding complex pixel blocks and non-complex pixel blocks of the new frame according to predictive coding techniques using prediction references identified in the first and second searches.

2. The video coding method of claim 1, wherein the complex pixel blocks are identified based on spatial complexity.

3. The video coding method of claim 1, wherein the complex pixel blocks are identified based on motion.

4. The video coding method of claim 1, further comprising classifying the pixel blocks of the new frame as belonging to a foreground or a background, wherein the identifying and the first and second searches are performed a first time for the foreground pixel blocks and a second time for the background pixel blocks.

5. The video coding method of claim 1, further comprising, if the second search does not obtain an adequate prediction reference for one of the remaining pixel blocks, coding the one remaining pixel block according to intra coding.

6. The video coding method of claim 1, further comprising, if the second search does not obtain an adequate prediction reference for one of the remaining pixel blocks:
    third searching from among all available reference frames for a prediction reference for the one remaining pixel block, and
    coding the one remaining pixel block using a prediction reference identified in the third search.

7. A video coding apparatus, comprising:
    a preprocessor to estimate complexity of pixel blocks of input frames to be coded,
    a coding engine to perform temporal predictive coding of input pixel blocks with reference to prediction pixel blocks of locally-stored reference frames;
    a reference picture cache to store the locally-stored reference frames;
    a motion search unit to supply prediction pixel blocks to the coding engine, the motion search unit to:
        first search for prediction references of the complex pixel blocks from among a plurality of reference frames,
        identify candidate reference frame(s) from the first searching, and
        second search for prediction references for remaining pixel blocks of the new frame, constraining its search to the candidate reference frame(s).

8. The video coding apparatus of claim 7, wherein the complex pixel blocks are identified based on spatial complexity.

9. The video coding apparatus of claim 7, wherein the complex pixel blocks are identified based on motion.

10. The video coding apparatus of claim 7,
    wherein the coding engine classifies pixel blocks of the new frame as belonging to a foreground or a background, and
    wherein the motion search unit performs the first and second searches a first time for the foreground pixel blocks and a second time for the background pixel blocks.

11. The video coding apparatus of claim 7, wherein if the second search does not obtain an adequate prediction reference for one of the remaining pixel blocks, the coding engine codes the one remaining pixel block according to intra coding.

12. The video coding apparatus of claim 7, wherein if the second search does not obtain an adequate prediction reference for one of the remaining pixel blocks:
    the motion search unit third searches from among all available reference frames for a prediction reference for the one remaining pixel block, and the coding engine codes the one remaining pixel block using a prediction reference identified in the third search.

13. A non-transitory computer readable storage device having stored thereon program instructions that, when executed by a processor cause the processor to:
    when a new frame is presented for coding, identify from among pixel blocks of the new frame a plurality of complex pixel blocks,
    search first for prediction references for the complex pixel blocks from among a plurality of reference frames,
    identify candidate reference frame(s) from the first search,
    search second for prediction references for remaining pixel blocks of the new frame, wherein the second search is limited to the candidate reference frame(s), and
    code the complex pixel blocks and non-complex pixel blocks of the new frame according to predictive coding techniques using prediction references identified in the first and second searches.

14. The device of claim 13, wherein the complex pixel blocks are identified based on spatial complexity.

15. The device of claim 13, wherein the complex pixel blocks are identified based on motion.

16. The device of claim 13, wherein the instructions further cause the processor to:
    classify the pixel blocks of the new frame as belonging to a foreground or a background,
    wherein the identifying and the first and second searches are performed a first time for the foreground pixel blocks and a second time for the background pixel blocks.

17. The device of claim 13, wherein the instructions further cause the processor to, if the second search does not obtain an adequate prediction reference for one of the remaining pixel blocks, code the one remaining pixel block according to intra coding.

18. The device of claim 13, wherein the instructions further cause the processor to, if the second search does not obtain an adequate prediction reference for one of the remaining pixel blocks:
    search third from among all available reference frames for a prediction reference for the one remaining pixel block, and
    code the one remaining pixel block using a prediction reference identified in the third search.

19. A video coding method, comprising:
    when a new frame is presented for coding, identifying a plurality of complex pixel blocks from among pixel blocks of the new frame,
    for each complex pixel block,
        first searching for prediction references for the complex pixel blocks from among a plurality of reference frames,
        identify candidate reference frame(s) from the first searching, second searching for prediction references for remaining pixel blocks of the new frame, wherein the second searching is limited to the candidate reference frame(s), when a reference frame is identified as a candidate reference frame, incrementing a count value associated with the respective reference frame, iteratively, starting with a reference frame having a highest count value, performing motion estimation search between pixel blocks of the new frame and the current reference frame, for each pixel block of the new frame for which an adequate prediction reference is found, coding the respective pixel block according to predictive coding techniques using a reference pixel block identified from the current reference frame, and performing another iteration using a reference frame having a next highest count value until a stop condition occurs.

20. The video coding method of claim 19, wherein the complex pixel blocks are identified based on spatial complexity.

21. The video coding method of claim 19, wherein the complex pixel blocks are identified based on motion.

22. The video coding method of claim 19, further comprising classifying the pixel blocks of the new frame as belonging to a foreground or a background, wherein the method is performed separately for the foreground pixel blocks and for the background pixel blocks.

23. The video coding method of claim 19, wherein the stop condition occurs when all pixel blocks of the new frame are coded.

24. The video coding method of claim 19, wherein the stop condition occurs when all reference frames having a non-zero count value are processed.

25. The video coding method of claim 24, further comprising, after all reference frames having a non-zero count value are processed, coding an uncoded pixel block of the new frame by intra coding.

26. The video coding method of claim 24, further comprising, after all reference frames having a non-zero count value are processed, coding an uncoded pixel block of the new frame by:

searching from among all available reference frames for a prediction reference for the uncoded pixel block, and coding the uncoded pixel block using a prediction reference identified in the search.

27. A video coding method, comprising:

when a new frame is presented for coding, identifying a plurality of complex pixel blocks from among pixel blocks of the new frame, for each complex pixel block, first searching for prediction references for the complex pixel blocks from among a plurality of reference frames, the search relying in part on motion sensor data associated with each reference frame, identify candidate reference frame(s) from the first searching, second searching for prediction references for remaining pixel blocks of the new frame, wherein the second searching is limited to the candidate reference frame(s), and coding complex pixel blocks and non-complex pixel blocks of the new frame according to predictive coding techniques using prediction references identified in the first and second searches.

28. The video coding method of claim 27, wherein the complex pixel blocks are identified based on spatial complexity.

29. The video coding method of claim 27, wherein the complex pixel blocks are identified based on motion.

30. The video coding method of claim 27, wherein motion measurements associated with each reference frame are obtained from sensor data provided by an image capture apparatus.

31. The video coding method of claim 27, wherein the first search omits searches of reference frames for which measured motion differs from motion associated with the new frame by at least a predetermined amount.

32. The video coding method of claim 27, further comprising classifying the pixel blocks of the new frame as belonging to a foreground or a background, wherein the identifying and the first and second searches are performed a first time for the foreground pixel blocks and a second time for the background pixel blocks.

33. The video coding method of claim 27, further comprising, if the second search does not obtain an adequate prediction reference for one of the remaining pixel blocks, coding the one remaining pixel block according to intra coding.

34. The video coding method of claim 27, further comprising, if the second search does not obtain an adequate prediction reference for one of the remaining pixel blocks:

third searching from among all available reference frames for a prediction reference for the one remaining pixel block, and coding the one remaining pixel block using a prediction reference identified in the third search.

35. A non-transitory computer readable medium storing program instructions that, when executed, cause a video coding device to perform a method, comprising:

when a new frame is presented for coding, identifying a plurality of complex pixel blocks from among pixel blocks of the new frame, for each complex pixel block, first searching for prediction references for the complex pixel blocks from among a plurality of reference frames, identifying a candidate reference frame(s) from the first searching, second searching for prediction references for remaining pixel blocks of the new frame, wherein the second searching is limited to the candidate reference frame(s), when a reference frame is identified as a candidate reference frame, incrementing a count value associated with the respective reference frame, iteratively, starting with a reference frame having a highest count value, performing motion estimation search between pixel blocks of the new frame and the current reference frame, for each pixel block of the new frame for which an adequate prediction reference is found, coding the respective pixel block according to predictive coding techniques using a reference pixel block identified from the current reference frame, and performing another iteration using a reference frame having a next highest count value until a stop condition occurs.

36. A video coding method, comprising:

when a new frame is presented for coding, identifying a plurality of complex pixel blocks from among pixel blocks of the new frame, for each complex pixel block, first searching for prediction references for the complex pixel blocks from among a plurality of reference frames, the search relying in part on motion calculations associated with each reference frame, wherein the motion calculations are obtained from pre-processing operations performed on an input video sequence, identifying candidate reference frame(s) from the first searching, second searching for prediction references for remaining pixel blocks of the new frame, wherein the second searching is limited to the candidate reference frame(s), and coding complex pixel blocks and non-complex pixel blocks of the new frame according to predictive coding techniques using prediction references identified in the first and second searches.

\* \* \* \* \*